Patented June 19, 1928.

1,673,806

UNITED STATES PATENT OFFICE.

ELMER ANSON DANIELS, OF BERWYN, AND HARRY STIRLING SNELL, OF CHICAGO, ILLINOIS, ASSIGNORS TO WESTERN ELECTRIC COMPANY, INCORPORATED, OF NEW YORK, N. Y., A CORPORATION OF NEW YORK.

HARDENING RESINOUS EXUDATIONS WITH AN AROMATIC SECONDARY AMINE.

No Drawing. Application filed August 21, 1924. Serial No. 733,445.

This invention relates to improved compositions of matter and methods of producing the same.

Objects of the invention are to produce an improved composition of matter having a resinous exudation as its base and to provide a method for producing the improved composition.

According to the main features of the invention a relatively small amount of diphenylamine is incorporated with a resinous exudation, preferably shellac, in any suitable manner, after which heat is applied to cause a chemical action between the diphenylamine and the shellac.

The result of this chemical reaction is a hard substance which is resistant to the ordinary solvents and which remains relatively hard at temperatures considerably above the temperatures at which shellac begins to soften. Although good results are obtained by the use of diphenylamine, other secondary amines of the aromatic series may also be employed for the same purpose. The exact chemical nature of the reaction which takes place is unknown and no method is at present available for determining the best proportions of the materials to be employed. The properties which are desired in the finished product, however, may be controlled in part by the amount of hardening agent which is employed.

Hardened shellac such as that which constitutes one embodiment of the present invention has been found to be of very great value in the production of improved molding compounds. An example of a molding composition in which the hardened shellac is incorporated is as follows: The shellac is dissolved in a suitable solvent, for example alcohol, the hardener in suitable amounts added thereto, either alone or in solution in a suitable solvent, and the entire mixture incorporated with wood flour, the amount of wood flour used depending upon the properties desired in the finished product. A suitable mixture comprising these ingredients which when completed can be employed as a substitute for wood or other materials may have the following proportions: shellac, 50 pounds; denatured alcohol, 15 gallons; diphenylamine, 0.5 pounds; and wood flour, 300 pounds. After all of the ingredients have been incorporated in the mixture it is agitated until there is a thorough dispersion of all of the ingredients throughout the mass. The mixture is then spread out and thoroughly dried to insure the removal of the last trace of alcohol, after which it is found to be in the form of a dry powder. This powder can then be molded by means of heat and pressure into whatever shape is desired.

The powder can be molded in a number of ways but good results are obtained by proceeding in the following manner: The powder is placed in a suitable mold and subjected to about 2000 pounds pressure per square inch for about ten minutes at a temperature of from 260° F. to 270° F. The source of heat is then removed and the composition allowed to cool while still under pressure to a temperature sufficiently low to allow the pieces to be handled. An article produced in this manner is resistant to alcohol and remains relatively hard at temperatures considerably above the temperature at which natural shellac begins to soften.

Hardened shellac produced in the manner described above may have a variety of uses, and it has been found of particular advantage as a binding material for an improved cork composition such as that described in our co-pending application, Serial No. 724,950, filed July 9, 1924.

What is claimed is:

1. A composition of matter formed by the condensation of a resinous exudation and a secondary amine of the aromatic series.

2. A composition of matter formed by the condensation of a resinous exudation and diphenylamine.

3. A composition of matter formed by the condensation of shellac and a secondary amine of the aromatic series.

4. A composition of matter formed by the condensation of shellac and diphenylamine.

5. A method of hardening resinous exudations, which consists in adding thereto a secondary amine of the aromatic series, and heating.

6. A method of hardening resinous exudations, which consists in adding thereto a secondary amine of the aromatic series, and then subjecting the resulting mixture to heat and pressure.

7. A method of hardening resinous exudations, which consists in adding diphenylamine thereto, and heating.

8. A method of hardening resinous exudations, which consists in adding diphenylamine thereto, and then subjecting the resulting mixture to heat and pressure.

9. A method of hardening shellac, which consists in adding thereto a secondary amine of the aromatic series, and heating.

10. A method of hardening shellac, which consists in adding thereto a secondary amine of the aromatic series, and then subjecting the resulting mixture to heat and pressure.

11. A method of hardening shellac, which consists in adding diphenylamine thereto, and then heating.

12. A method of hardening shellac, which consists in adding diphenylamine thereto, and then subjecting the resulting mixture to heat and pressure.

In witness whereof, we hereunto subscribe our names this 16 day of August A. D., 1924.

ELMER ANSON DANIELS.
HARRY STIRLING SNELL.